(12) United States Patent
Newman et al.

(10) Patent No.: US 6,359,777 B1
(45) Date of Patent: Mar. 19, 2002

(54) REMOVABLE COMPONENT STRUCTURE FOR A MOBILE COMPUTER

(75) Inventors: Edward G. Newman, Fairfax Station; Michael D. Jenkins, Burke, both of VA (US)

(73) Assignee: Xybernaut Corporation, Fairfax, VA (US)

( * ) Notice: Subject to any disclaimer, the term of this patent is extended or adjusted under 35 U.S.C. 154(b) by 0 days.

(21) Appl. No.: 09/749,168

(22) Filed: Dec. 27, 2000

(51) Int. Cl.[7] ................................................. G06F 1/16
(52) U.S. Cl. ...................... 361/683; 361/784; 206/320; 364/708.1
(58) Field of Search ................................ 361/683–686, 361/724–727, 679–680, 784, 790; 206/320, 576, 214; 364/708.1

(56) References Cited

U.S. PATENT DOCUMENTS

| | | | | |
|---|---|---|---|---|
| 5,285,398 A | * | 2/1994 | Janik | 364/708.1 |
| 5,385,230 A | * | 1/1995 | Nygard et al. | 206/214 |
| 5,844,824 A | | 12/1998 | Newman et al. | |
| 6,140,981 A | * | 10/2000 | Kuenster et al. | 345/8 |
| 6,288,892 B1 | * | 9/2001 | Lanz et al. | 361/683 |

* cited by examiner

Primary Examiner—Leo P. Picard
Assistant Examiner—Hung Van Duong
(74) Attorney, Agent, or Firm—James J. Ralabate

(57) ABSTRACT

This invention involves a computer housing that has a number of compartments for inserting or removing computer components. When a wearable computer is used, weight is extremely important. This invention allows the user to keep only the computer components he or she needs and easily remove the components that are not essential or needed.

14 Claims, 2 Drawing Sheets

REMOVABLE COMPONENT STRUCTURE FOR A MOBILE COMPUTER

This invention relates to a mobile computer and, more specifically, to a structure with removable components.

BACKGROUND OF THE INVENTION

Since mobility and miniaturization has recently characterized the direction of the computer industry, wearable or user-supported PCs are beginning to appear in the marketplace. U.S. Pat. No. 5,844,824 discloses a hands-free, portable computer system which involves a body-worn, hands-free computer which does not rely exclusively upon a keyboard input or manual activation apparatus but rather has various additional activation means which are hands-free. At the time of the invention, this represented the state-of-the-art with respect to user-supported computers. Previously, users who needed mobile computers were left only with laptops, palmtops or PDAs running very limited operating systems. The output devices of U.S. Pat. No. 5,844,824 (824) consists of any display including a head-mounted display (HMD) or a neck-hung or a wrist-mounted display or a flat panel display (FPD). The CPU and battery can be worn on a belt as two separate components which are connected by a single wire to the output device. The CPU is housed in a single system enclosure which contains memory, CPU, hard disk, connectors and PC card slots, the basic components of any computer box. The battery can be external to this device and is also worn on the belt and connected by a single wire to the CPU providing it with power. It would be very desirable to provide an 824-type system whereby the user may reduce or increase the robustness of his system through the addition or removal of modular components. For example, it may be desirable depending upon the application of the user to trade off capability for size of the device. In some instances, the user may not need the extra battery capacity, additional PCMCIA card slots, extra memory, connector array or other non-essential components.

SUMMARY OF THE INVENTION

The disclosed invention overcomes the deficiencies in the non-wearable prior art computer through a novel and ingenious modular computer architecture. The invention is directed towards an expandable user-supported computer system hereinafter designated as the Mobile Assistant "MA". This MA is a variant on the existing user-supported computer with a modular expansion capability.

In the present invention, a singular unit case or housing is provided with a plurality of indentations or compartments. Each compartment has built-in electrical connections to each of the other compartments. If there is a computer component housed in a compartment then it will be in electrical connection with all other components in other compartments in the singular unit case. Modular components can be snapped into or removed from the skeleton unit case which is singular in form and compact. For example, it is known to use a belt or vest with pockets for housing computer components such as those disclosed in U.S. Pat. Nos. 5,285,398 and 5,491,651. The problems of the system of these two patents are systems that are too bulky, fit around the entire waist or torso of a user and are contrary to the direction of the computer industry which is smaller, more compact, less obtrusive and easy to handle.

The present invention provides an ice cube-like tray with several compartments each of which can house a computer component. One can house a CPU, the other a battery or an I/O device or a speech recognition means, etc. Each modular computer component is removable thereby allowing the user to insert as many or as few components as he or she needs.

It is therefore an object of this invention to provide a user supported computer system devoid of the above-noted disadvantages.

Another object of this invention is to provide a simple, effective means to tailor make a user-supported computer to specifically fit ones needs.

Still another object of this invention is to provide a foundation tray into which as many or as few computer components may be inserted.

Yet a further object of this invention is to provide a wearable computer that is lightweight, fits on a small portion of user's body (not totally around a waist or torso).

Another object of this invention is to provide a very easy to manufacture and economical wearable computer that reduces manufacturing costs for this type computer.

Still a further object of this invention is to provide a lightweight, easy to adjust from product generation to generation without a need to fully redesign.

Yet still another object of this invention is to provide a novel base computer tray into which a plurality of computer components can be removably inserted as needed.

These and other objects are accomplished in accordance with this invention by providing a MA base tray into which any of a number of computer components removably fit. The easiest way to explain the present invention is to compare the base tray with an ice cube tray with each of the compartments in electrical connection with all of the other compartments. On the outside of the tray are ports for connection to peripherals such as video cameras, PCMCIA card devices, head or other type displays, printers, keyboards, etc. The monitor can be part of the cover for the tray or can be connected via the ports. On the bottom portion (side closest to the user when used) are belt loops for attachment to the belt or other portion of the user's body. Any suitable display may be used such as head-mounted display, display integral with the tray or computer housing, neck hung displays, wrist-mounted displays, flat panel displays or any other suitable display. It is critical to the present invention that the system contain voice recognition means of the type disclosed in U.S. Pat. Nos. 5,305,244 and 5,844,824 whose disclosures are incorporated by reference into the present disclosure.

At various times and in relation to the desired application, it may be desirable for a user to have more or less capability in exchange for a larger or smaller physical form factor. Thus, if a user wanted to use the system in a minimal configuration with the lightest, smallest form factor, he could remove from the tray modular components of the MA system such as extra batteries, PC card slots, array of connectors, additional memory or storage modules or other non-essential components. In this manner he could have a single, thin box or tray capable of fitting in a coat pocket coupled to a single output device, be it a HMD or FPD, CRT or other small wired or wireless display device. In other circumstances the user may be willing to accept a fully-occupied tray in order to gain extra battery life to the system or to add additional interfaces or input/output devices. Finally, there may be a more expanded configuration of the mobile MA enclosure which is formed by plugging in a third component to the tray base unit combination to provide an even greater expansion and interface capability. This configuration will be the most robust and would suit users who are more concerned about the nature of their application than the physical dimensions of the device. This configuration would add a hot swappable heavy duty battery as well as mobile device bay port for expansion devices and a USB hub to attach additional USB devices. Additionally, there can be a desktop configuration whereby the base MA system enclosure is connected to a desktop docking station enabling it to function as a traditional PC with any compatible peripherals. Thus, the design permits flexible configurations which can be tailored to meet the specific needs of the user and his application.

DETAILED DESCRIPTION OF THE DRAWING AND PREFERRED EMBODIMENTS

Figure 1:
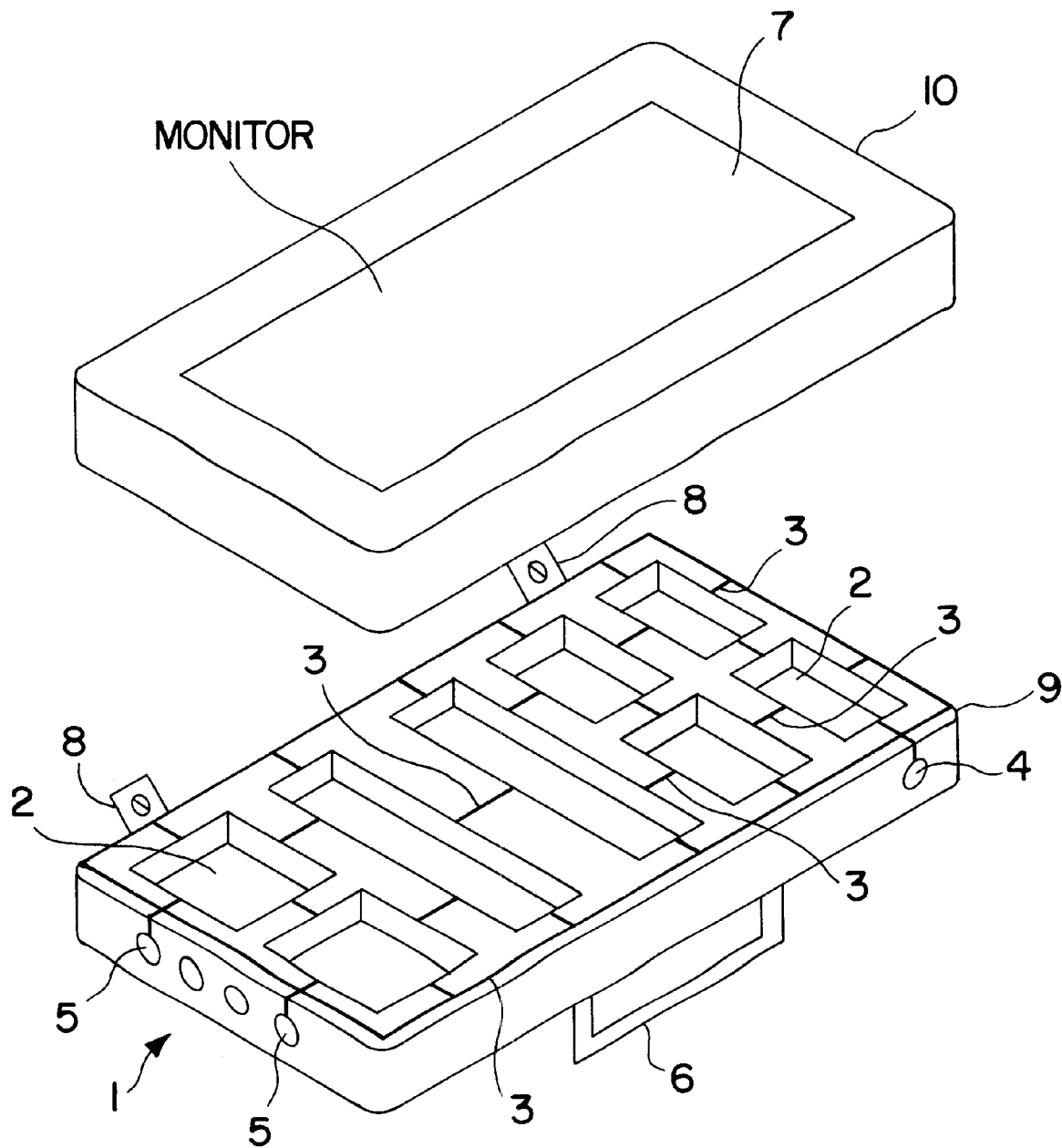
FIG. 1 is a perspective view of the computer tray of this invention.

In FIG. 1 a computer housing or tray 1 has several component compartments 2 which may be the same or different sizes. Each compartment 2 is in electrical connection via wire (or other) connectors 3 with all other compartments 2 and with the power input 4 and peripheral ports 5. If the user wanted to use the system or tray 1 in a minimal configuration with the lightest form factor, he or she could remove from the tray 1 extra batteries, PC card slots, additional memory or other non-essential components. For the lightest configuration or level 0 expansion, the CPU and battery (and display) are the only components.

The computer housing or tray 1 contains belt loops 6 or any other suitable user attachment means. These loops 6 are used with a belt or strap worn around the waist or torso of a user. A monitor 7 can be integral with the computer housing 1 connected by a hinge means 8 or other suitable means. Alternatively, the monitor can be a display connected to one of the ports 5. The computer housing 1 is shown as rectangular but any suitable configuration may be used. The housing contains a main section 9 and cover 10.

Figure 2:
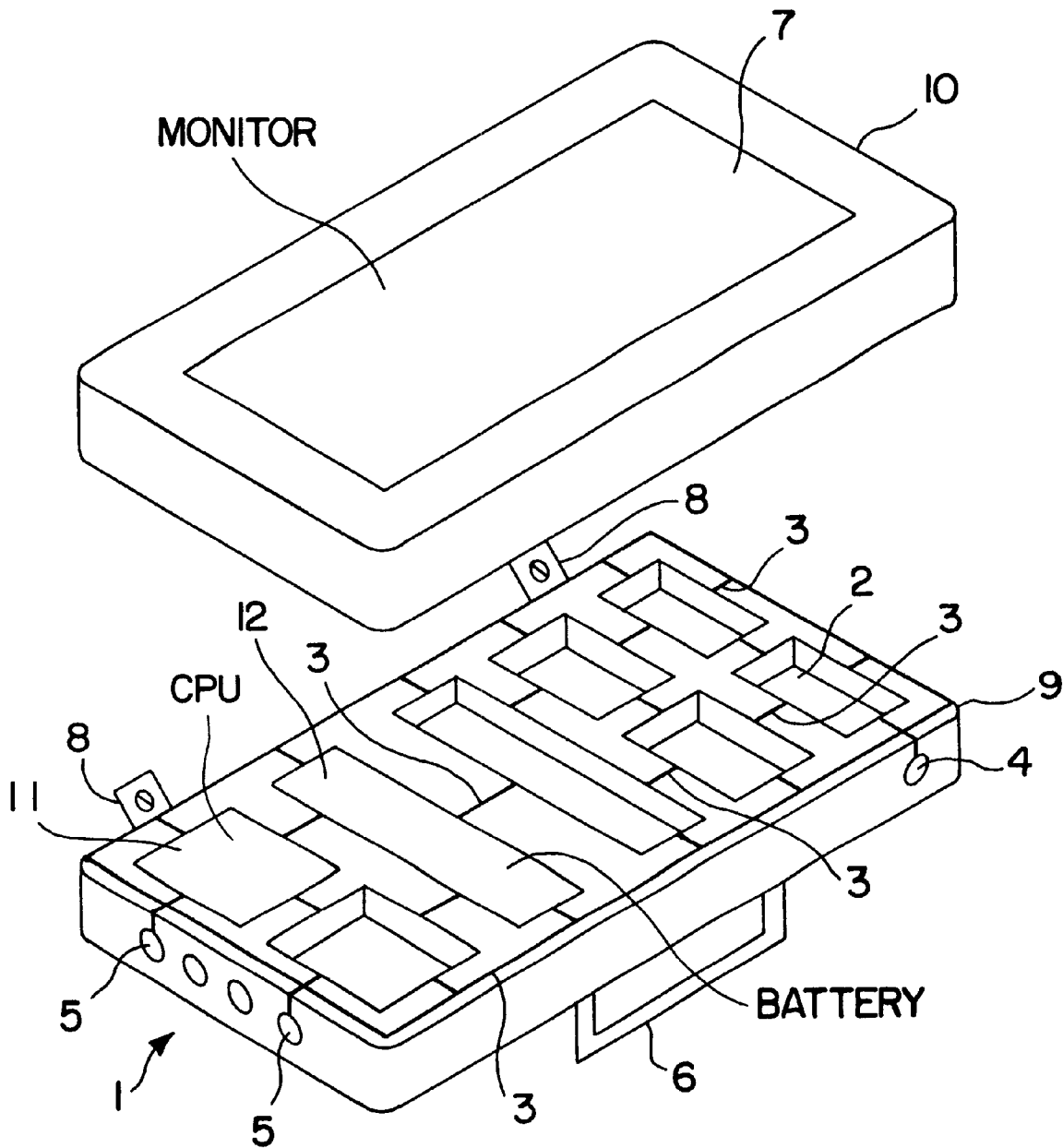
FIG. 2 is a perspective view of the computer tray of this invention with two computer components therein.

In FIG. 2 a CPU 11 is housed in one of the compartments 2 and the CPU 11 is in electrical connection to power source or battery 12. Any other computer components can be filled into compartments 2 as desired. For example, a memory unit, a voice-recognition unit, etc. may be housed in any of the compartments 2. In FIG. 2, only a CPU 11 and a battery 12 are shown for clarity purposes only. The computer tray 1 can be expanded to include as many computer components as desired.

The invention utilizes modular architecture in the design of the MA enclosure to achieve different levels of user-directed configurations. At least three levels of configuration have been contemplated in the preferred embodiment but one of ordinary skill in the art will understand that fewer or more levels may also be utilized to achieve the same benefits of flexibility. For example, in a level 0 expansion, the CPU 11 with integral battery 12 and external display are the only two components as shown in FIG. 2. The CPU enclosure in the level 0 configuration will contain only the minimal system level components required to allow operation of the computer including a main battery. The battery 12 is one of a NiCad, NiMh, Lithium Ion, Fuel Cell or other power source that fits integral to the base CPU enclosure. This allows the user the smallest and lightest configuration for situations where only minimal computer capability is required. Also integral to this device or tray is the main battery that can be attached to the CPU tray or enclosure 1.

There can be compact flash memory sockets as well on the front side. Integral to the motherboard can be a DSP chip which receives audio input for processing of speech for controls and applications as well as for processing any audio input. On the front side, on top of above the main battery is a user-configurable communications adapter module, hereinafter CAM. The CAM serves as the communication terminal through which external wireless communication travels. The CAM performs functions such as wireless interface control, communications baseband processing, soft router, link handoff control, security/Encryption ENDEC, personal navigation/GPS. The CAM will have integral hardware support the communications standards such as CDMA, GSM, TDMA, 3G, 802.11, Bluetooth, custom commercial, custom military and any other public or proprietary communications protocol.

DESCRIPTION OF THE PREFERRED EMBODIMENT

In the preferred embodiment a user of the disclosed invention has flexibility with respect to the use and configure ability of his or her computer system. In a simplest mode, the user will use only the base MA tray enclosure and a UID (User Interface Device). This will give the user the minimum-sized device which can be worn in a coat pocket. The user will have at his or her disposal three connection ports, UID, USB and IEEE 1334 and an optional add-on single PCMCIA card slot, the communications module and a port replicator port 5 on the bottom of the tray 1 as well as the integral CAM. There is also a main battery attached to this unit which will provide intermediate battery life relative to the heavy duty battery that connects to the expansion pack. This base system will allow the user to plug in a video camera or any USB compatible device or any PCMCIA card, connect to a network remotely, run any application stored on the local hard disk of the computer, download content or any other application he or she desires if the user can work under the constraint of the limited battery life. The CAM will allow the user to connect to any wireless communications network such as CDMA, TDMA, GSM or other military or commercial communications networks. The CAM will also selectively receive GPS information and include an interface for providing this information to the user or wearer of the system. This functionality provided by the CAM will remain persistent throughout any of the configurations. There is also a DC power input on the unit so that if the user was in a car, for example, he or she could plug into a DC power connector that taps into the car's battery power giving the user virtually endless supply of power. Thus, the level 0 configuration, the user is provided with a moderately robust system which can be taken virtually anywhere without losing any of its base functionality. The operating system is in no way reduced in rigor by the level 0 configuration, merely the connections that are available to the system and the battery life are reduced.

In another configuration, the MA can be docked like a laptop computer.

When finished working remotely, the user can simply set the MA tray enclosure vertically down into the desktop docking station to create a fully functional desktop PC. The docking station will serve as point of electrical contact with the base enclosure and also will have contacts to recharge the main battery. The docking station will have integral to it a power supply, hard drive, CD-ROM, network interface card, modem and expansion capability. Thus, to the user, it will appear to be a normally configured desktop PC whereby the user can either plug the HMD or FPD or have a traditional desktop CRT or FPD attached to the docking station to serve as the interface device. Through the use of the docking station the user is exacting twice the utility from his MA. He can use it as a desktop at home or at the office or simply remove it from the docking station and place it in his pocket or on his belt.

If the user is going to be wearing the MA unit for an extended period of time and needs more flexibility than that provided in the level 0 configuration, it may be desirable for him or her to switch to level 1 configuration. This will necessitate the wearing of a small rigid holster and supporting belt which restrains the holster which in turn restrains the MA. The holster has a plug in the bottom which is substantially the same as the docking station connector. It secures the device and allows the user to wear it in a manner that may be more conducive to long term use. In addition to supporting the CPU, the holster adds several connection ports such as parallel, serial, PS2 A and B, IRDA and connection for interfacing with the expansion pack serving as a segue to the level 2 configuration. In this configuration, the user can alternatively add keyboards, mice, printers, etc. as is deemed necessary while still carrying a small physical form factor.

Complimentary to the level 1 configuration is the level 2 configuration. Level 2 adds an expansion module which also attaches to the belt as discussed above. The expansion pack interfaces with the holster through a single cable and is typically worn on the opposing side of the user's body to the holster. The cable may be integral to the belt or fastened thereto. On one major face the expansion pack accepts a heavy duty hot-swappable battery pack which significantly extends the battery life of the main battery. If a battery is connected to the expansion pack, then it overrides the power supplied to the CPU by the main battery, thus allowing for the hot swap ability. The opposing major face of the expansion pack receives a mobile I/O device bay card slot to the system. The mobile I/O device bay facilitates additional devices and interfaces to be added. Examples include large HDD, digital tape recorder, and/or customer specific industrial instrumentation circuitry. Also, there are several additional USB ports and high speed serial IEEE 1334 ports integral to the expansion module. This further increases the flexibility of the configuration as the USB interface has become increasingly popular with makers of peripheral devices. Additionally, the IEEE 1394 fire wire port allows for future expansion as this interface becomes more pervasive.

Thus, the invention disclosed above teaches a novel and ingenious advancement over the prior art. It provides the user with all the functionality of a traditional work station when operated through the desktop docking station configuration while providing all the flexibility of hands-free operation and mobility characteristic of wearable computers when worn or carried by the user. Additionally, it allows the user to determine his or her own configuration, trading off physical dimensions for capability and compatibility on a per use basis further maximizing the overall utility of the computer system. While specific embodiments of the present invention have been disclosed, one of ordinary skill in the art can imagine additional embodiments which do not depart in scope from the general spirit of the invention.

What is claimed is:

1. A computer housing for containing removable computer components, said housing comprising a plurality of compartments, each compartment having means to removably house a computer component, said housing having a monitor, voice activation means, a power source and on an external portion thereof peripheral ports for attachment to desired peripherals, and an external power source inlet for connection to an external electrical source of power, said compartments in electrical contact with each other and in electrical contact with said ports and said external power source INLET, said housing having means for attachment to a user's body.

2. The housing of claim 1 wherein said power source is an internally-housed battery.

3. The housing of claim 1 wherein said power source is an external power source connected via said inlet.

4. The housing of claim 1 wherein said computer housing has user attachment means integral therewith.

5. The housing of claim 1 wherein said monitor is integral with and directly attached to said computer housing.

6. The housing of claim 1 wherein said monitor is external to and connected with said housing via said peripheral ports.

7. The housing of claim 1 comprising a main section with said compartments and a compartment cover.

8. The computer housing for containing a plurality of computer components, said housing comprising a main section and a movably attached cover or lid, a plurality of compartments in said main section, each compartment having means to removably house a computer component, said housing having a monitor, voice activation means, a power source and on an external portion thereof peripheral ports for attachment to desired peripherals, and an external power source inlet for connection to an external source of power, said compartments in electrical contact with each other and in electrical contact with said ports and said external power source INLET, said housing having means for attachment to a user's body.

9. The housing of claim 8 wherein said power source is an internally-housed battery.

10. The housing of claim 8 wherein said power source is an external power source connected via said inlet.

11. The housing of claim 8 wherein said computer housing has user attachment means integral therewith.

12. The housing of claim 8 wherein said monitor is integral with and directly attached to said computer housing.

13. The housing of claim 8 wherein said monitor is external to and connected with said housing via said peripheral ports.

14. The housing of claim 8 comprising a main section with said compartments and compartment cover.

* * * * *